Nov. 19, 1929.  R. L. SCHUHMANN  1,736,136
COMPUTING SCALE
Filed Sept. 4, 1928   2 Sheets-Sheet 1
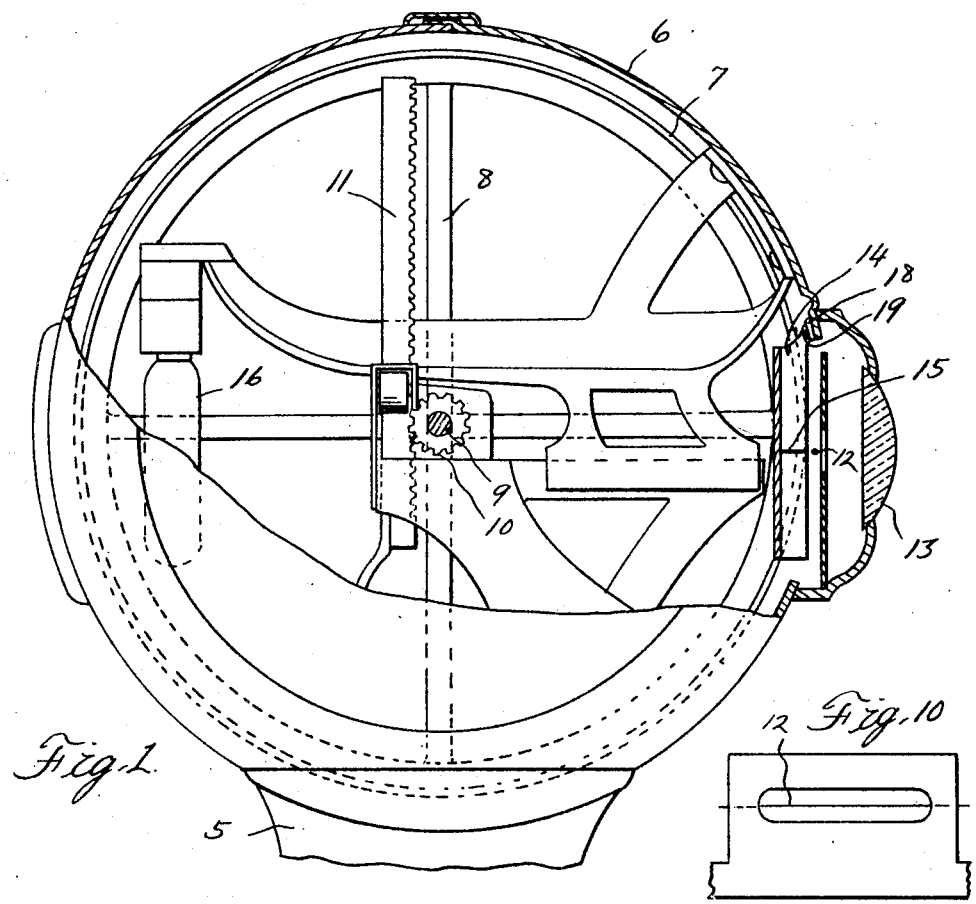
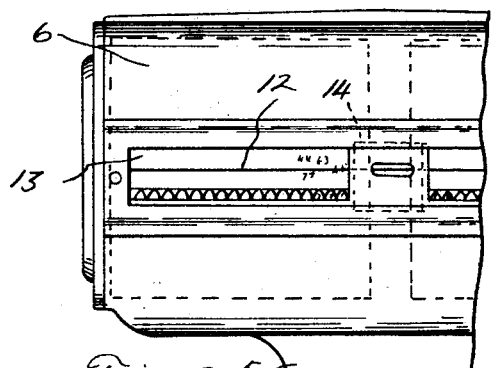
Inventor
Richard L. Schuhmann
By Swan, Frye & Murray
Attorneys Nov. 19, 1929.　　R. L. SCHUHMANN　　1,736,136
COMPUTING SCALE
Filed Sept. 4, 1928　　2 Sheets-Sheet 2

Inventor
Richard L. Schuhmann
By Swan, Frye & Murray
Attorneys

Patented Nov. 19, 1929

1,736,136

UNITED STATES PATENT OFFICE

RICHARD L. SCHUHMANN, OF LOUISVILLE, KENTUCKY, ASSIGNOR TO WALTER F. STIMPSON, OF LOUISVILLE, KENTUCKY

COMPUTING SCALE

Application filed September 4, 1928. Serial No. 303,850.

This invention relates to computing scales, and more particularly to the type known as counter scales wherein are utilized revolving cylinder indicating means on which the weight and value computations are displayed.

One of the objects of this invention is the provision of means for insuring the correct reading of the weight and value indications by persons of different heights.

Another object of this invention is the arrangement of simple and effective guide means adjacent the indicator of a computing scale whereby the operator using the scale can readily check to ascertain whether or not he is in position to read the correct weight and value computations.

Other objects and advantages will be apparent from the following description, wherein reference is made to the accompanying drawings showing preferred embodiments of my invention.

In the drawings:

Figure 1 is a central section through the indicating means of a cylinder type computing scale, wherein my improved reading sight guide is embodied.

Figure 2 is a front elevation of the cylinder head and associated parts.

Figure 10 is a detail elevation of the sight opening showing the appearance to the operator of the marker when his eye is in proper position for reading the scale, and Figures 11 and 12 are similar views showing the appearance of the marker when the eye of the operator is respectively above and below proper reading positions.

Figure 3:
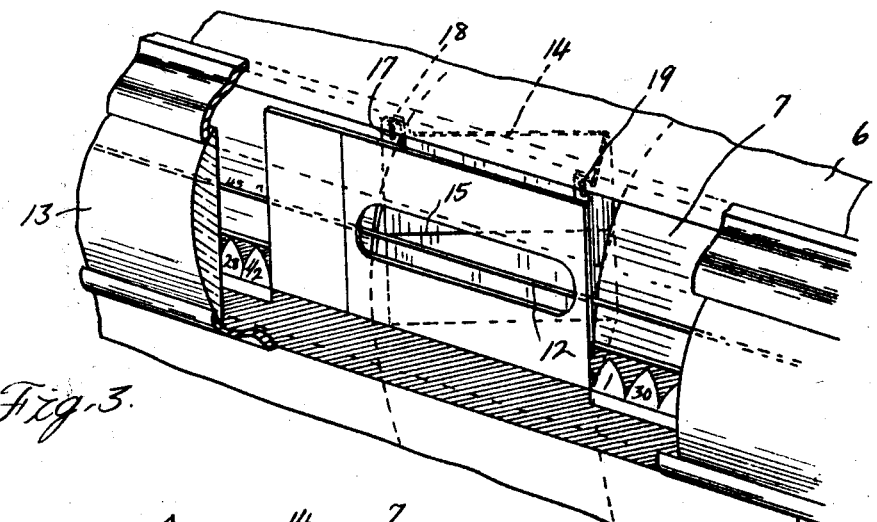
Figure 3 is an enlarged perspective view showing a preferred arrangement of my improved sight guide with relation to the revolving cylinder and fixed reading wire of a cylinder computing scale.
Figure 4:
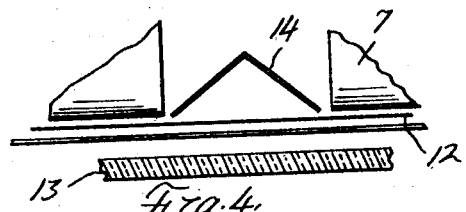
Figure 4 is a diagrammatic view showing in horizontal section the positioning of the sight guide with relation to the computing cylinders and reading wire of the scale.

Referring now to the drawings, the numeral 5 designates a hollow column upon the upper extremity of which is secured a cylindrical casing 6 within which is revolubly mounted a cylinder 7 of a cylinder type computing scale. Upon the surface of the cylinder is marked the usual or any desired weight and value indications at various prices per pound of the commodities weighed upon the scale. Such scale indicating cylinders are old in the art and various means have been heretofore utilized for rotating them through a suitable arc corresponding to the weight of the articles being weighed. Since the present invention does not relate to the means for properly rotating the cylinder, no attempt has been made herein to illustrate and describe a complete operative cylinder scale, but only so much of the operating mechanism for the cylinder is shown as is believed necessary to properly delineate the relative positions of the parts of the scale indicating mechanism. Thus, one of the end spiders 8 supporting the cylinder chart 7 is illustrated in Figure 1 and the shaft 9 of the cylinder, which carries a pinion 10 meshing with a rack 11 the foot of which is suitably connected with a scale lever or other moving part of the scale so that the rack will be vertically depressed from its normal zero position in accordance with the extent of movement of the scale lever, which in turn is moved according to the weight of the commodity being weighed. As the rack 11 is depressed the cylinder 7 is rotated through the medium of the pinion 10 and shaft 9, thereby swinging the face of the cylinder past a fixed indicating wire or line 12 positioned between the edges of a sight opening 13 in the casing 6. The fixed indicator 12 ordinarily extends entirely across the face of the cylinder 7 so that the indications in any price or weight column on the cylinder can be read by the operator using the scale, to quickly learn the weight and value of a commodity being weighed. In other words, since the indicator 12 is fixed relatively to the cylinder and the cylinder is rotated through an arc governed by the weight of the article being weighed, it is only necessary to correctly read the indications on the chart in alignment with the fixed indicator rod to readily ascertain the weight of the article and its value at any desired price per pound. However, since the cylinder must be free to revolve with as little friction as possible, it is necessary to provide some clearance between the fixed indicating wire 12 and the revolving cylinder 7. Spacing of the fixed indicator 12 from the cylinder provides an opportunity for misreading the scale, inasmuch as persons of different heights might not view the same value computations on the cylinder as aligned with the fixed indicating wire. Thus, a person whose eyes are in horizontal alignment with the indicating wire 12 would view the weight or value computations upon the cylinder 7 as thus horizontally aligned with the indicating wire (which are the correct indications of weight and value) while a tall person with his eyes above the horizontal plane of the indicating wire 12 would view as aligned with the indicating wire weight and value computations on the chart 7 below those that are viewed by the person whose eyes are on a level with the indicating wire. Similarly, a short person with eyes below the horizontal plane of the indicating wire will view as aligned with the indicating wire weight and value computations on the chart 7 above those viewed by the person whose eyes are on a level with the indicating wire. And, while three different readings would result, all of the persons would believe they are correctly reading the scale, for they are reading the indications of weight or value upon the chart that are aligned with the indicating wire according to their line of vision. It is to correct this possibility of inaccuracy in reading the scale by people who are attempting to properly read it, that my invention is designed, and I accomplish this result by providing a sight guide in horizontal alignment with the indicating wire 12 whereby the person reading the scale can readily ascertain when their eyes are at the proper height to correctly read the scale.

As best illustrated in Figures 1 and 3, I preferably arrange my improved sight guide 14 so that an elongated marker 15 thereon is in horizontal alignment with the indicating wire 12 of the scale. The sight guide 14 may be of any desired shape and the marker 15 thereon of any desired length, but I have found it advantageous for quickly lining up the wire 12 with the marker 15 to extend the intermediate portions of the marker rearwardly from the wire 12 further than the ends of the marker. Thus, in Figure 3 I have shown the marker 15 as inscribed upon a plate 14 bent so that its central portion is furthest removed from the indicating wire 12 and diverging from the central portion toward either end of the plate. With this arrangement, the marker 15 when viewed through the sight opening 13 of the scale appears as a line when the eyes are on the same horizontal plane as such marker and as a pair of converging lines as long as the eyes are above or below the horizontal plane of the marker. Accordingly, it is immediately apparent to the operator of the scale when his eyes are not correctly placed to properly read the scale and, by elevating or lowering his eyes until the marker 15 appears as a straight line substantially merging with the indicating wire 12, he can bring himself into proper position for correctly reading the scale. While in such position he glances at the weight column or the column showing the desired price per pound indications and knows that he is properly reading the scale. If he has any doubts concerning whether he is properly reading it he has only to again glance at the marker 15 to see whether it is still in horizonal with the indicating line 12 to reassure himself.

Figure 5:
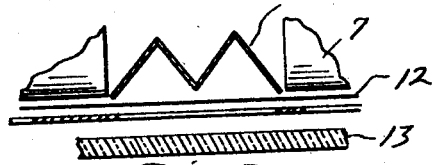
Figures 5, 6 and 7 are views similar to Figure 4 but showing modified forms which my improved sight guide may conveniently take.
Figure 8:
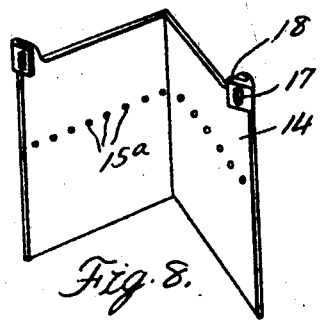
Figure 8 is a detail perspective view of my improved sight guide detached from the scale and provided with a marker formed as a line made up of a series of perforations.
Figure 6:
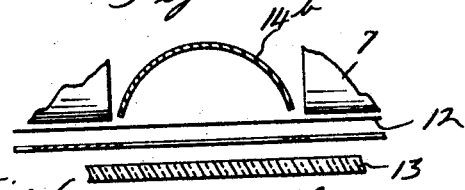
Figure 7:
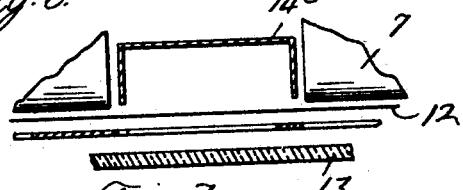
Figure 9:
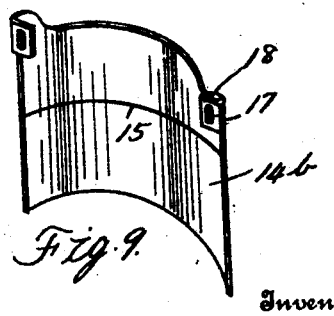
Figure 9 is a view similar to Figure 8 but showing a different shape of sight guide having an opaque marker arranged on a translucent background.

While the shape of the chart 14 in Figures 1 and 3 is well suited to give the effect desired to the marker 15, it is to be understood that the sight guide chart could be of many other shapes and still accomplish the same result. Thus, in Figure 5, I have diagrammatically shown a sight guide chart 14$^a$ having its portions adjacent the ends of the chart slanting rearwardly and then returning toward the indicator wire 12 so that the central portion of the chart is nearer the indicating wire than the other intermediate portions. This gives the effect of two V-shaped markers, both of which must be aligned with the indicating wire when reading the scale. However, in this construction I prefer that the central portion of the sight guide chart be spaced rearwardly from the ends of the chart to aid the simultaneous viewing of both of the adjacent V-shaped markers. In Figure 6 I have shown a sight guide chart 14$^b$ curvilinear in cross-section, and in Figure 7 I have shown a sight guide chart 14$^c$ with sides at substantially right angles to the central portion of the chart, which central portion is furthest removed from the indicating wire. These and other shapes might readily be used whereby the effect desired is secured. When sufficient light for reading the scale is provided from in front of the scale, it is possible for my sight guide chart to be constructed of opaque material, such as white enameled metallic plate, and the marker 15 be formed as a line of paint, printer's ink, or the like, of any desired color, preferably contrasting with the color of the plate and that of the indicating wire. When, however, the scale is artificially lighted whenever a commodity is being weighed, my sight guide chart 14 may be formed as an opaque plate wherein is formed a plurality of aligned perforations 15ª to form a line substantially as shown in Figure 8, or as a translucent plate on which an opaque marker 15 is inscribed, the light showing through the translucent plate, and bringing the marker 15 into strong relief. To best accomplish this illumination of the sight guide chart 14, I prefer to provide one or more electric lamps 16 within the casing 6 behind the sight guide chart 14, which lamps are illuminated through the action of a switch controlled from a moving part of the scale so that the current passes to the lamps 16 simultaneously with the beginning of a weighing operation and continues until the operation is completed and the article being weighed is removed from the scale platform.

When the indicating chart 7 is formed as a divided cylinder, i. e. with a pair of smaller cylinders separated from each other at the inner ends, I preferably locate my sight guide chart 14 between the spaced inner ends of the smaller cylinders. This positions the sight guide chart substantially centrally of the indicating mechanism where it can be conveniently used by the operator for checking the position of his eyes for properly reading the scale. Also, in such position, the sight guide chart does not obscure the view of any of the weight or value indications upon the cylinder 7. It is believed to be apparent, however, that my sight guide chart could also be positioned anywhere adjacent the indicating wire so long as the marker 15 thereon is maintained in horizontal alignment with the indicating wire 12.

In assembling the scale and installing it for use, it is possible that the marker 15 and indicating wire 12 may be thrown out of horizontal alignment. To readily re-align the marker 15 with the indicator wire, I preferably provide means for vertically moving the sight guide 14, such, for example, as elongated slots 17 in the inturned tabs 18 of the sight guide chart. Suitable securing elements, such as screws 19, (see Figure 1) are passed through the elongated slots 17 of the tabs and threaded into the casing 6, the screws being loosened to permit re-aligning of the sight guide 14 and then being tightened to again secure the sight guide in proper position with its marker 15 in horizontal alignment with the indicating wire 12.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

Having described my invention, I claim:

1. In a scale of the character described, having a revoluble cylinder bearing weight and value indications thereon and a stationary indicator adjacent but spaced from the cylinder, a stationary sight guide chart bearing a marker all parts of which are in horizontal alignment with said indicator, but portions of the marker are spaced further from the indicator than other portions thereof.

2. In a scale of the character described, having a revoluble cylinder bearing weight and value indications thereon and a stationary indicator adjacent but spaced from the cylinder, a stationary sight guide chart bearing a marker all parts of which are in horizontal alignment with said indicator, but the intermediate portions of the marker are spaced further from the indicator than the end portions thereof.

3. In a scale of the character described, having a revoluble cylinder bearing weight and value indications thereon and a stationary indicator adjacent but spaced from the cylinder, a stationary sight guide chart bearing a marker in horizontal alignment with said indicator and arranged on the opposite side of the indicator from the eye of the scale user so that it obscures the view of none of the indications upon the cylinder.

4. The combination with the indicating mechanism of a scale including a movable chart and a fixed indicator spaced from and extending across the chart, of a stationary sight guide arranged on the opposite side of the indicator from the eye of the scale user, and bearing a marker in horizontal alignment with said indicator, portions of the marker being spaced further from the indicator than other portions thereof.

5. The combination with the indicating mechanism of a scale including a movable chart and a fixed indicator spaced from and extending across the chart, of a stationary sight guide arranged on the opposite side of the indicator from the eye of the scale user, and bearing a marker in horizontal alignment with said indicator, the intermediate portions of the marker being spaced further from the indicator than the end portions thereof.

6. The combination with the indicating mechanism of a scale including a movable chart and a fixed indicator spaced from and extending across the chart, of a stationary sight guide bearing a marker all parts of which are in horizontal alignment with said indicator, the marker being of less length than the indicator and arranged with its intermediate portions spaced further from the indicator than its end portions.

7. The combination with the indicating mechanism of a scale including a movable chart and a fixed indicator spaced from and extending across the chart, of a stationary sight guide arranged on the opposite side of the indicator from the eye of the scale user, and bearing a marker of less length than and in horizontal alignment with said indicator.

8. The combination with the indicating mechanism of a scale including a movable chart and a fixed indicator spaced from and extending across the chart, of a stationary sight guide bearing a marker in horizontal alignment with said indicator, the sight guide being of translucent material and the marker thereof being of opaque material.

9. The combination with the indicating mechanism of a scale including a movable chart and a fixed indicator spaced from and extending across the chart, of a stationary sight guide bearing a marker in horizontal alignment with said indicator, the sight guide being of translucent material and the marker thereof being of opaque material contrasting in color to the colors of both the sight guide and the fixed indicator.

10. The combination with the indicating mechanism of a cylinder computing scale including a fixed indicator and a pair of spaced cylindrical charts bearing weight and value indications thereon revoluble past the fixed indicator, of a sight guide arranged between the cylinders on the opposite side of the indicator from the eye of the scale user and bearing a marker in horizontal alignment with the fixed indicator.

11. The combination with the indicating mechanism of a cylinder computing scale including a fixed indicator and a pair of spaced cylindrical charts bearing weight and value indications thereon revoluble past the fixed indicator, of a sight guide arranged between the cylinders on the opposite side of the indicator from the eye of the scale user and bearing a marker in horizontal alignment with the fixed indicator, the intermediate portions of the marker being spaced rearwardly from the indicator for a greater distance than the end portions of the marker.

12. The combination with the indicating mechanism of a cylinder computing scale including a fixed indicator and a pair of spaced cylindrical charts bearing weight and value indications thereon revoluble past the fixed indicator, of a sight guide arranged between the cylinders and bearing a marker in horizontal alignment with the fixed indicator, the sight guide being formed of translucent material and the marker thereof of opaque material.

13. The combination with the indicating mechanism of a cylinder computing scale including a fixed indicator and a pair of spaced cylindrical charts bearing weight and value indications thereon revoluble past the fixed indicator, of a sight guide arranged between the cylinders and bearing a marker in horizontal alignment with the fixed indicator, the sight guide being formed of translucent material and the marker thereof of opaque material of contrasting color to the colors of both the sight guide and the fixed indicator.

In testimony whereof I sign this specification.

RICHARD L. SCHUHMANN.